United States Patent [19]

Lonchamp et al.

[11] Patent Number: 4,548,615

[45] Date of Patent: Oct. 22, 1985

[54] PROCESS FOR MANUFACTURING SOLID FUELS FROM HEAVY HYDROCARBON OILS AND VEGETABLE MATERIALS

[75] Inventors: Daniel Lonchamp, Tassin la Demi-Lune; Vong N. Hoai, Eybenes; François-Pierre Navarre, Charbonniere les Bains, all of France

[73] Assignee: Institut Francais du Petrole, Rueil-Malmaison, France

[21] Appl. No.: 625,886

[22] Filed: Jun. 29, 1984

[30] Foreign Application Priority Data

Jun. 30, 1983 [FR] France ................. 83 11049

[51] Int. Cl.⁴ .................... C10L 5/44; C10L 5/14
[52] U.S. Cl. ............................... 44/1 D; 44/6; 44/10 A; 44/23
[58] Field of Search ............. 44/1 D, 6, 10 A, 23

[56] References Cited

U.S. PATENT DOCUMENTS

| | | | |
|---|---|---|---|
| 1,922,391 | 8/1933 | Odell | 44/6 |
| 2,431,891 | 12/1947 | Rosencrance | 44/6 X |
| 2,618,537 | 11/1952 | Rabu | 44/23 |
| 4,272,322 | 6/1981 | Kobayashi | 44/1 D |
| 4,428,844 | 1/1984 | Wagener | 44/1 D |

FOREIGN PATENT DOCUMENTS

| | | | |
|---|---|---|---|
| 2270315 | 12/1974 | France | 44/1 D |
| 57-14794 | 3/1982 | Japan | 44/1 D |
| 1018519 | 1/1966 | United Kingdom | 44/1 D |
| 2085919 | 5/1982 | United Kingdom | 44/1 D |

*Primary Examiner*—Carl F. Dees
*Attorney, Agent, or Firm*—Millen & White

[57] ABSTRACT

A method for manufacturing a solid fuel composition by admixing vegetable organic material with an oil-in-water macro-emulsion and drying the resultant composition.

19 Claims, No Drawings

PROCESS FOR MANUFACTURING SOLID FUELS FROM HEAVY HYDROCARBON OILS AND VEGETABLE MATERIALS

This invention concerns a process for manufacturing solid fuels, as well as the solid fuels obtained by this process.

It is known that heavy hydrocarbon fractions, particularly the residues of boiling point higher than 350° C., are difficult to use as liquid fuels in view of their high viscosity and their high content of impurities, particularly sulfur and metals.

On the other hand, considerable amounts of organic materials originating from argiculture and food-agricultural industries are available. They are usually designated by the general term of biomass.

Some of these materials constitute fuels of relatively low fuel value as wood, when cut to the size of the burning apparatus. Furthermore the use as fuel of wood fragments such as sawdust, industrial wood discharge or coppicewood fragments, provides handling problems. Besides, certain organic materials, particularly garbage, are usually discharged or burnt in dumping grounds, uselessly. More problematically, the organic materials cannot be stored, due to fermentation phenomena; they contain much water and absorb easily additional water when stored outside, their thermal value is low, their homogeneity is insufficient and some of them have a high content of inorganic material; all these disadvantages are responsible for their lack of success as fuels.

The object of the invention is to produce fuels having the following advantageous properties:
high thermal value,
good stability; they do not generate vapors and hence can be stored without danger,
they are inexpensive,
they are easy to handle due to their solid state,
their water content is low and they do not absorb water, when stored, even in free air,
their sulfur content is low, usually less than 2%.

The process of the invention consists of admixing an oil-in-water emulsion with an organic material, the oil of the emulsion being a hydrocarbon oil of viscosity higher than 500cSt at 20° C. (1 stoke32 $10^{-4}m^2/s$) and the average size of the oil droplets of the emulsion being selected from 0.5 to 20 micrometers (step a). If necessary, the resultant mixture is put in shape and then subjected to drying, at least partially.

During the mixing step, various ingredients can be added, for example in order to improve the physical and/or mechanical characteristics of the final solid material or to improve its combustion.

The emulsification of the hydrocarbon can be effected by passing a mixture of hydrocarbon oil, water and optionally an emulsifier in a suitable mixer. The operation is conducted at a temperature at which the oil is sufficiently fluid, said temperature depending on the oil viscosity. Usually, the temperature ranges from 50° to 200° C., preferably from 80° to 140° C., and the pressure must be sufficient to avoid the water vaporization. Hence, the pressure is preferably selected between 1 and 20 bars.

In view of the relatively large size of the oil droplets of the emulsion used in the above-mentioned step (a), this emulsion may be called a macro-emulsion, by contrast with the microemulsions wherein the droplets are of a much smaller size.

The heavy hydrocarbon oils as used in the invention include any oil or coal derivative having the above-mentioned viscosity. They mainly consist of products whose fractions boiling above 350° C. or at least the major part thereof have been removed by natural distillation or industrial distillation.

These oils thus comprise residues, such as those obtained at the bottom of an atmospheric distillation column, whose boiling point is above for example 340° C., or vacuum-distillation residues of hydrocarbon cuts whose boiling point is, for example, above 560° C. These oils also comprise tars, pitches, bitumen from bituminous sands or tars from bituminous shales.

The process is also applicable to heavy cuts of heavy crude oils which, as the residues from other origins, are characterized by:
a high content of sulfur compounds,
a high content of mineral contaminants (nickel, iron, vanadium etc.).

The metals content of these cuts may be higher than 2000 ppm and the content of sulfur elements is, as an average, from 4 to 6% by weight and may be higher than 8%. The density, as an average, is close to 1.

Some cuts, such as some oily muds from refineries or chemical plants or certain heavy residues from cracking or steam-cracking, may contain fractions boiling below 350° C.

When the oils have less than the required viscosity, the latter can be increased by admixture with heavy fractions, for example asphalt fractions. The preferred hydrocarbon oils are those containing, naturally or after addition, at least 0.5% by weight of asphaltenes (determination with heptane), and for example 2 to 30% by weight of asphaltenes.

The organic materials may originate, for example, from waste materials, from cultivated energy-producing plants or from natural fields, the water content by weight of these materials being variable from 5 to 95%.

The waste-materials may be from human or animal origin, for example urban muds, dungs, adequate garbage fractions; they also comprise combustible residues from the food-agricultural industry, for example draff, cornstalks, Jerusalem artichoke stalks, lees of wine, pulps or residues from wood work, for example bark, saw-dust, black liquors.

The cultivated energy-producing plants comprise, for example, the aquatic plants growing in soft waters, briny waters and oceans, as well as ground-plants, cultivated for producing energy, for example Provence canes.

The organic materials also comprise peats or sediments of high lignocellulosic content.

The emulsifying agent may be a colloid substance of mineral origin, such as finely divided clays currently used in drilling operations, or preferably a surface active substance which may be anionic, cationic, non-ionic or zwitterionic.

Examples of non-ionic agents are the compounds formed by reacting ethylene oxide with, for example, an alcholol, an alkly phenol, an ester, an amide or an alkyl sulfate.

Examples of anionic agents are the sulfonates, for example alkyarylsulfonates, alkysulfates and carboxylates of sodium, potassium or ammonium.

Examples of cationic agents are the quartenary ammonium salts with a long hydrocarbon chain.

Examples of zwitterionic surfactants are alkylcarboxybetaines, alkylamidosultaines, as well as carboxybetaines derivating from naphthenic acids.

These agents are very well known in the art and the invention is not limited to the use of specific categories of said agents.

A preferred agent however is tall-oil, being either the so-called crude tall-oil, before distillation, or tall-oil pitch recovered from the bottom of the rectification column of crude tall-oil.

As a matter of fact, this agent has several advantages: low price, high efficiency, even in low proportions of 0.5 to 1.5% by weight, preferably 1%, its property, and during the emulsion break, to be preferentially driven towards the organic phase, which is of interest with respect to the weight balance but also decreases the organic charge of the aqueous phase, thus making the treatment thereof generally useless.

The tall-oil or tall-oil pitch must be used as a salt obtained by means of sodium hydroxide, for example. An example of convenient proportion is 0.25 gramm of sodium hydroxide and 1 g of tall-oil for 80 g of water and 120 g of heavy curde oil.

Another preferred emulsifier is an asphalt fraction originating from a desphalting unit, said fraction having preferably the following characteristic: density from 1.04 to 1.1 at 50° C. and asphaltene content (determination with heptane) from 30 to 60% by weight. This type of natural emulsifier, more specially adapted to crude oils of low or very low asphaltene content, has the following advantages:

it is insensitive to the salinity variations (since it can withstand the salt content of the formation waters),
its price is low and it is expected to be available in large amounts in the future,
it enhances the stability of the emulsion when an emulsifier of conventional type is used.

It is clear that when the oil forms itself a macroemulsion with water, as certain asphaltic oils do, the use of a surfactant of another type is unnecessary.

The condition to be satisfied is to make a macroemulsion, i.e. an emulsion in water of oil droplets whose average size is from 0.5 to 20 micrometers, preferably from 1 to 10 micrometers. Such an emulsion is relatively unstable and breaks rather quickly in contact with the cellulosic material, so that the latter can be impregnated with the oil whose viscosity is restored to a relatively high level (close to its initial viscosity).

The emulsification conditions must thus be so selected as to avoid the formation of a microemulsion, i.e. a much finer emulsion (average size of the droplets smaller than 0.1 $\mu$m, e.g. 2 to 100mm). The microemulsion forms when using a too high proportion of surfactant, for example 10% weight of the oil phase or more, or when, even with a small content of surfactant, a co-surfactant, such as an alcohol or an amine, is added.

Usually, the proportion of surfactant is selected from 0.1 to 3% by weight of the oil.

Water may be from any origin. However, a water of salt content at most equal to 20 ppm by weight per liter is preferred.

The pH is selected in relation with the selected surfactant. With non-ionic and zwitterionic surfactants, the pH is substantially immaterial; with anionic surfactants (carboxylates or sulfonates) which are perferably used, a preferred pH is from 9 to 12. With cationic surfactants, on the contrary, an acid pH will be adopted.

The oil-in-water emulsion may contain a variable water proportion, from 25 to 50% by weight, preferably from 30 to 35%, the remaining part corresponding to the oil.

After its manufacture, the emulsion may be either used immediately or stored, for example at a temperature of about 10° to 80° C.

The emulsion has a much lower viscosity than the starting oil, e.g. a viscosity from 10 to 100 cSt, preferably from 20 to 50 cSt (1 stoke = $10^{-4}$m$^2$/s) at 20° C., as compared with a viscosity of the starting oil of for example from 600 to 2000 cSt.

The emulsion can thus be pumped and stored without risks (security) and without additional energy consumption.

The biomass may be used without further processing when in the form of finely divided elements (e.g. lees of wine, coffee-grounds, mud from water-treating plants). Otherwise, it is advantageusly homogenized by use of any mixing apparatus. This operation may be repeated when several substrates have to be mixed. For certain energy applications, the particles of the biomass must be reduced in size by passage through a mechanical crusher or lacerating apparatus.

The biomass cannot be stored when moist and liable to ferment, and must be admixed to the emulsion as soon as possible since, otherwise, the carbon loss by aerobic or anaerobic fermentation is substantial and odors evolve.

In some cases, it may be of interset to dry the biomass before the mixing step; it may even be useful to use an already dried biomass. The organic mixture is then admixed with the oil emulsion, the emulsion and biomass proportions being selected within a wide range. When expressing these proportions with respect to the hydrocarbon oil amounts for the emulsion and with respect to the organic material as dry material, a useful ratio "oil/dry material" will be from 1:10 to 10:1, preferably from 1:3 to 3:1.

The mixing step may be conducted at room temperature in view of the fact that the emulsion viscosity is much lower than that of the starting oil, as above mentioned.

The mixing time for achieving a good homogenization depends on the quality of the biomass and on the type of emulsion. This time is usually from 30 seconds to 5 minutes.

During this operation, the viscosity of the mixture at the beginning is low. Then the viscosity increases as the result of the emulsion break. The oil at this time recovers its initial viscosity, for example from 600 to 2000 cSt at 100° C.

This double action of wetting and emulsion breaking results in a water release which may reach, depending on the substrates, from 10 to 50% of the water volume of the mixture, and the released water is discharged.

Various ingredients may be added to the emulsion and to the biomass during or prior to the mixing step, these ingredients optionally improving the properties of the resultant materials.

Examples of such ingredients are organic additives, such as:
asphalts or paraffinic cuts,
carbon hydrates,
elastomer residues, or
residues of polymer or copolymer,
or minerals, for example:
substances liable to react with sulfur (e.g. lime), used catalysts,
used ion-exchange resins of clays.

As above-mentioned, asphalt, irrespective of its manufacturing process, is of interest as additive for improving the capacity of crude oils to form emulsions and the quality of the emulsions. In addition, it increases the weight of the organic phase and this is desirable for improving the structure. The asphalt addition may be effected by admixing heavy hydrocarbons, forming the base of the liquid emulsion, with liquid asphalt. The addition of asphalt, as that of any additive, must be such that the viscosity of the oil to be emulsified be not too high and, for example, not above 4000 cSt at 150° C.

As above-indicated, the hydrocarbon oil used to form the emulsion may consist exclusively of asphalt. As stated hereinafter, it is also possible to use asphalt as coating agent of the fuel in a final operation.

Another additive is constituted by oil cuts of high paraffin content whose melting point ranges fron 40° to 80° C., but whose viscosity at 100° C. is very low, for example from 10 to 25 cSt, this being of interest when considering an optional new liquefaction of the solid fuel. Oils resulting from the liquefaction of solid residues from elastomers manufacture or from waste tires may also be added. These waste tires, after breaking to pieces, are devulcanized, at 170° C. or more, at the contact of heavy hydrocarbons such as thoses above described or lighter residues of high content of unsaturated compounds such as steam-cracking or cracking-residues. This addition results in an increase of the oil viscosity. Thus, from steam-cracking residues (distillation range from 180° to 480° C.), oils have been obtained which, at 100° C., have a viscosity of 8000 cSt. They can still be pumped. Certain polymers of copolymers, or waste materials from their manufacture, may also be added.

An example is ethylene/vinyl acetate copolymer which has a strong compatibilizing power on the biomass and the hydrocarbon. These products, which are expensive but used in small proportion, have interesting properties as physical binder of the biomass and the hydrocarbon.

Carbon hydrates or polysaccharides of the formula $(C_6H_{10}O_5)_n$, and for example starch, may also be added. Natural resins originating from vegetal sap, such as arabic gum, may also be incorporated to the oil.

The organic additives may be used in a proportion which can reach or even exceed 30% by weight.

Examples of mineral additives are: lime in a proportion from 0.5 to 5% by weight and used catalysts or catalyst carriers having for example a surface from 100 to 500 m$^2$/g. This type of material is useful for retaining sulfur or for fixing metals such as vanadium and nickel, present in the oil residues and undersirable in the combustion step. Certain used ion-exchange resins, particularly those which have been used for water treatments, are also useful as additive. The mineral additives are used in a proportion not exceeding 5% by weight. Coal, lignite or coke may also be added.

An important result of the operation of mixing the emulsion with the biomass is to make possible the storage of the latter. It has been ascertained over several months that no gas evolves from the mixture of example 1, well known as very sensitive to fermentation. This observation reveals a fundamental feature in the prospect of adding value to the biomass since the storage makes possible to dry the hydrocarbon/biomass mixture during the summer time, period at which nuclear power is available at a cheaper price, or to dry this mixture in the night after storage during the day for making use of the electric power available at cheaper price during the night.

The storage is however not compulsory and the drying step may be performed immediately. The moist fuel then has the appearance of pasty elements of small size which are fed to the dryer, wherein the preferred drying agent is hot air.

Hot air may originate from any source and may be supplied from a unit for recovering heat from solar, industrial or other origin.

The fuel obtained at this stage is either solid or pasty. In the latter occurrence, it is neessary to proceed to the coating thereof, achieved by admixing the hot fuel with one or more additional materials. The latter may be of the same nature as the additives introduced before drying. However, the following materials are perferred:

Organic materials:
totally or partially dried biomass which, as a result of its oleophilic property, will well adhere to the surface
asphalt
paraffins or waxes
Mineral materials:
combustion ashes
earth, clays
lime
used catalysts or used ion-exchangers This coating improves the mechanical strength of the fuel, but may also participates to the addition of elements useful for the combustion (lime).

The cooling may be performed with air or with water. The obtained product is hydrophobic.

The average characteristics of a fuel obtained from an oil vacuum-distillation residue are indicated below.

|  | Vacuum residue | Biomass | Fuel according to the invention |
|---|---|---|---|
| Heating value kcal/kg* | 9500–10000 | 2500–5000 | 6000–7500 |
| Ash % b.w. | — | 1–5 | 1–2 |
| Volatile material % b.w. | >80 | >80 | >80 |
| Sulfur content % b.w. | 3.5 to 7 | 0.1 to 0.5 | 1.5 to 3 |
| Moistness % b.w. | 0.1 to 0.5 | high (hydrophilic) | <0.1 (hydrophobic) |
| Capacity to be stored | possible with heating | impossible | possible even at room temperature |
| Transportation | difficult, only when hot | difficult | possible even at room temperature |
| Density | about 1 | very low, about 0.1 to 0.5 | about 1 floating or suspension in water possible |

*1 kcal = 4.18 kJ

EXAMPLES

The macroemulsion is prepared from a vacuum residue having the following characteristics:
Volumic mass at 15° C.: 1020 kg/m$^3$
Viscosity at 100° C.: 1000 cSt (mPa.s)
   at 210° C.: 20 cSt (mPa.s)
Asphaltenes: 12.4
Flash point: 335° C.
Conradson carbon: 18.9%
Heating value: 9400 kcal/kg (1 kcal=4.18 kJ)
S=5.5% (b.w.)

N=0.3%
Na=34 ppm
V=129 ppm
Ni=46 ppm 60 parts by weight of vacuum residue are admixed at 140° C. with 40 parts by weight of water in an apparatus provided with a stirrer. It was unnecessary to add a surfactant, the asphaltene having the necessary surfacting properties. The obtained macroemulsion (water content of 40% by weight) had an average size of oil droplets of 4 microns and its viscosity at 20° C. was 30 centipoises (1 poise = 0.1 Pa.s)

EXAMPLE 1

60 parts by weight of urban muds containing:
water: 60% by weight
organic material: 24% by weight
ash: 16% by weight
are impregnated with 40 parts by weight of the above macroemulsion; after shaping and drying in hot air at 80° C., followed with coating by means of 2% by weight of lime, a solid fuel is obtained which has the following characteristics:
heating value: 6800 kcal/kg (1 kcal = 4.18 kJ)
water content: 0.1% by weight
ash content: 20% by weight

EXAMPLE 2

55 parts by weight of urban muds of example 1 and 5 parts by weight of oily refinery muds of the following composition:
water: 66% b.w.
hydrocarbons: 30% b.w.
ash: 4% b.w.
are impregenated with 40 parts by weight of the macroemulsion; after drying and two coatings, the first identical to that of Example 1 and the second by means of 2% by weight of semi-refined paraffin, a fuel is obtained whose heatng power is 7000 Kcal/kg.

EXAMPLE 3

70 parts by weight of distillery waste (lees of wine, marc of grapes, pulp), having a dry material content of 30% by weight, are impregnated with 30 parts by weight of the macroemulsion. After drying at 80° C. and coating with 1.5% by weight of lime, a solid fuel is obtained which has a heating value of 7500 Kcal/kg and an ash content of 4.9% by weight for a content of volatile material of 79.6% by weight.

EXAMPLE 4

70 parts by weight of laminaria algae of Atlantic (dry material: 30%) are admixed with 30 parts by weight of macroemulsion. The resultant mixture is no longer liable to ferment and can be stored. After drying and coating with 2% by weight of lime, a solid fuel is obtained whose heating value is 7000 Kcal/kg.

EXAMPLE 5

Example 1 is repeated by replacing the urban mud by mushroom-beds residues. The resultant solid fuel has a heating value of 6200 Kcal/kg.

EXAMPLE 6

Example 1 is repeated except that the urban mud is replaced by residual muds from anaerobic digestion. The resultant solid fuel has a heating value of 6100 Kcal/kg.

EXAMPLE 7

40 parts by weight of pine-needles are impregnated with 60 parts by weight of the above macroemulsion after shaping and drying in hot air at 80° C. After coating with 2% by weight of lime, a solid fuel is obtained which has the following characteristics:
heating value: 7300 Kcal/kg
water content: 0.2% by weight
ash content: 1% by weight

EXAMPLE 8

20 parts by weight of wheat-straw are impregnated with 80 parts by weight of the above macroemulsion after shaping and drying in hot air at 80° C. The coating is effected with 2% by weight of finely crushed straw and a solid fuel is obtained which has the following characteristics:
heating value: 8000 Kcal/kg
water content: 0.1% by weight
ash content: 0.5% by weight

EXAMPLE 9

50 parts by weight of lacerated salvaged paper are impregnated with 50 parts by weight of macroemulsion containing 30% by weight of $H_2O$ and 70% by weight of heavy hydrocarbons; after shaping a solid fuel is obtained whose characteristics are as follows:
heating value: 6000 Kcal/kg
ash content: less than 1% b. w.

What is claimed as this invention is:

1. A process for manufacturing a solid fuel composition, which process comprises admixing vegetable organic material with an oil-in-water macro-emulsion and drying the resultant composition, said oil being a hydrocarbon oil whose viscosity at 100° C. before incorporation of the oil into the emulsion is higher than 500 centistokes (1 stoke = $10^{-4} m^2$ s), the average size of the oil droplets of said macro-emulsion being from 0.5 to 20 micrometers and the ratio by weight of the oil of the macro-emulsion to the vegetable organic material is from 1:10 to 10:1, as dry weight, wherein said macro-emulsion is broken on contact with the vegetable organic material and said material is impregnated with the oil.

2. A process according to claim 1, wherein the composition is shaped before drying.

3. A process according to claim 1, wherein the oil comprises at least 0.5% by weight of asphaltenes.

4. A process according to claim 1, wherein the ratio by weight of the oil of the macro-emulsion to the cellulosic material is from 1:3 to 3:1, as dry weight.

5. A process according to claim 1, wherein at least one surfactant is further added in a proportion of 0.1 to 3% by weight with respect to the oil.

6. A process according to claim 1, wherein the macro-emulsion comprises 25 to 50% by weight of water and 75 to 50% by weight of oil.

7. A process according to claim 1, wherein the macro-emulsion has a viscosity from 10 to 100 cSt (1 stoke = $10^{-4} m^2/s$) at 20° C.

8. A process according to claim 1, further comprising separating water released from the breaking of the emulsion during said admixing.

9. A process according to claim 1, wherein lime is added to the solid fuel composition in a proportion from 0.5 to 5% by weight of the dried composition.

10. A process according to claim 1, wherein the resultant composition is coated with 1–3% by weight of an oil-in-water emulsion of a hydrocarbon whose viscosity is 500–10 000 cSt at 140° C. (1 stoke $=10^{-4} m^2/s$) and with coal powder in a proportion from 0.5 to 5% by weight of the composition.

11. A process according to claim 1 comprising the further step of coating the dried composition with lime, asphalt, wax, combustion ashes or clay.

12. A process according to claim 1, wherein the average size of the oil droplets in the emulsion is from 0.5 to 20 micrometers.

13. A process according to claim 1 wherein the average size of the oil droplets in the emulsion is from 1 to 10 micrometers.

14. The process of claim 1 wherein an emulsifying agent is added to the oil-in-water emulsion during admixing.

15. The process of claim 14 wherein the emulsifying agent is crude tall-oil, or tall-oil pitch in a proportion of 0.5 to 1.5% by weight of the oil.

16. The process of claim 14 wherein the emulsifying agent comprises finely divided clay.

17. The process of claim 14 wherein the emulsifying agent comprises a surface active compound.

18. The process of claim 1 wherein the vegetable organic material comprises, dung, wood residue, garbage fractions or food wastes.

19. The process of claim 1 wherein the vegetable organic material comprises corn stalks, Jerusalem artichoke stalks, coffee grounds, bark, sawdust or lees of wine.

* * * * *